Sept. 3, 1968  S. P. ARMSTRONG  3,399,852
TRANSFER SADDLE
Filed April 24, 1967
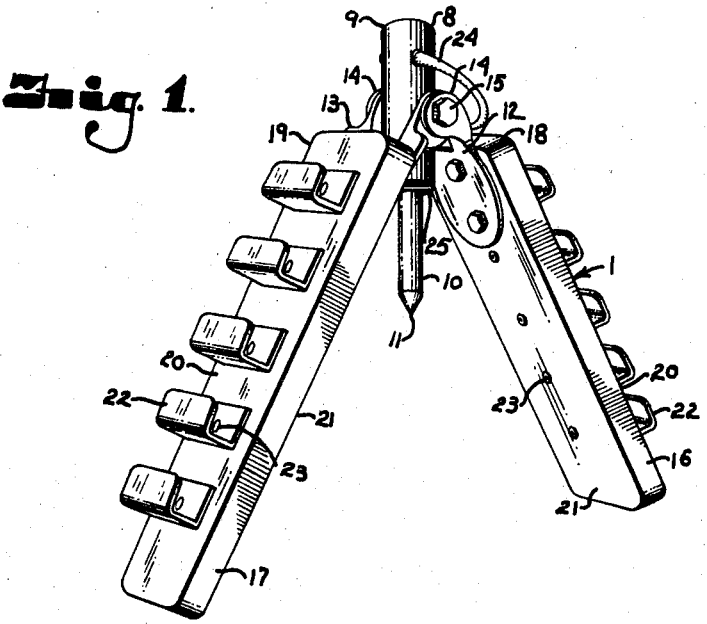
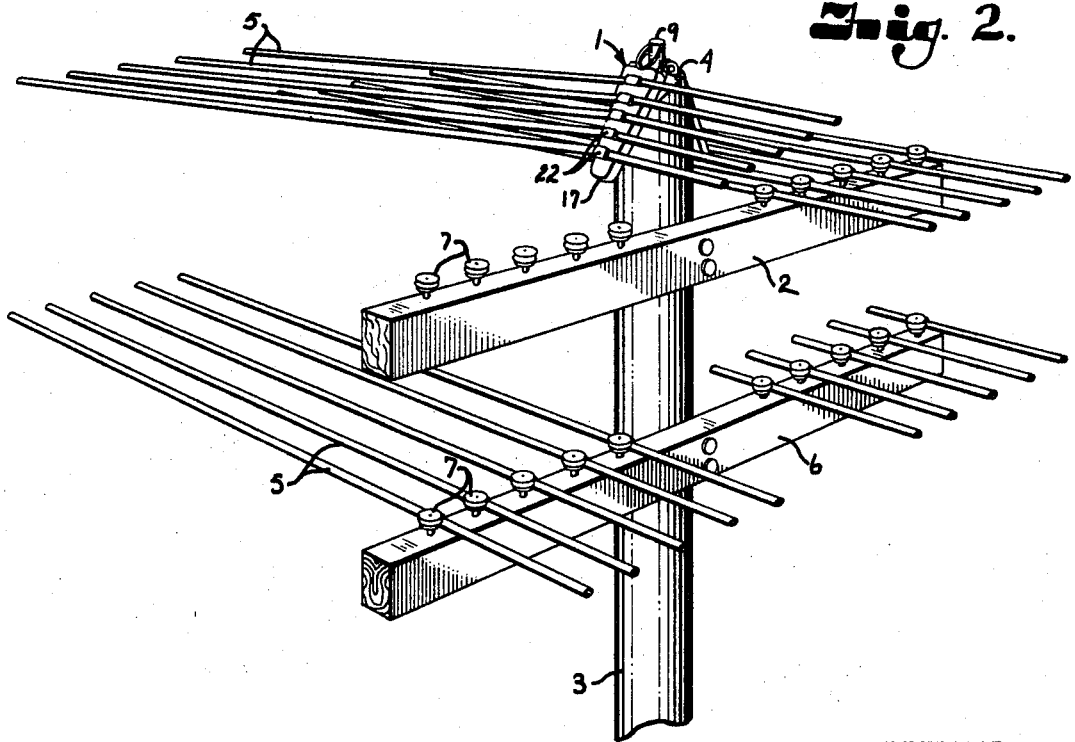
INVENTOR.
SAMUEL P. ARMSTRONG
BY Fishburn, Gold & Litman
ATTORNEYS

3,399,852
TRANSFER SADDLE
Samuel P. Armstrong, 4904 E. 23rd St.,
Kansas City, Mo. 64127
Filed Apr. 24, 1967, Ser. No. 632,988
6 Claims. (Cl. 248—49)

ABSTRACT OF THE DISCLOSURE

A transfer saddle holds transmission lines during the replacement or repair of the upper cross arm of telephone poles and the like and includes a nail member having a pointed shank adapted to be driven into the tapered top of the pole, the nail member having clevis members pivotally mounted thereon and supporting a pair of legs with upwardly open line receiving hooks spaced therealong. A pull ring is engaged with the nail member above the clevis members to simplify removal of the transfer saddle from the pole.

---

This invention relates to signal or power transmission line poles and, more particularly, to devices for supporting upper lines during maintenance procedures which require the repair or replacement of the upper cross arm.

During repair or replacement of lower pole cross arms, the lower transmission lines normally supported thereon may be tied or clamped to the cross arm immediately thereabove. This is not possible with the upper cross arm and the temporary support of the transmission lines carried thereby has long presented a difficult problem. This invention has for its principal object to provide a simple device by which the upper cross arm transmission lines may be temporarily supported with ease and convenience.

The transfer saddle of this invention comprises a nail member which has a pointed shank adapted for insertion at the tapered top of a telephone pole or the like, the nail member having a pair of legs pivotally mounted thereon and maintained in positions extending downwardly and outwardly therefrom by contact with the pole top. Upwardly open hooks on the legs receive the lines and upon removal of the lines, the saddle may be conveniently withdrawn from the pole top by means of a pull ring or the like engaged with the nail member. Other objects and advantages of this invention will become apparent from the following description taken in connection with the accompanying drawings wherein are set forth by way of illustration and example certain embodiments of this invention.

FIG. 1 is a perspective view of a transfer saddle embodying this invention.

FIG. 2 is a fragmentary perspective view showing the upper portion of typical transmission line pole with the transfer saddle engaged with the top thereof and supporting upper cross arm transmission lines.

Referring to the drawings in more detail:

The reference numeral 1 generally indicates a transfer saddle embodying this invention. The saddle 1 is adapted for use in replacing or repairing the upper cross arm 2 of a transmission line pole such as a telephone pole 3 of the type having a tapered top 4. Normally transmission lines 5 are supported on the upper cross arm 2 and lower cross arms 6 through suitable insulators 7 mounted on and extending upwardly from the respective cross arms.

The transfer saddle 1 comprises a nail member 8 having a vertical elongated cylindrical head 9 and an integral downwardly directed shank 10 rigidly extending coaxially therefrom. The shank 10 is of substantially smaller diameter than the head 9 and terminates in a sharp lower point 11.

Clevis members 12 and 13 each have a pair of spaced apart ears 14 formed integrally therewith. The head 9 is located between the respective pairs of ears 14, which are positioned in overlapping relation, while the bodies of the clevis members 12 and 13 are positioned in opposed relation on opposite sides of the head 9. A pin 15 extends through the pairs of ears 14 and transversely through the head 9, pivotally mounting the clevis members 12 and 13 on the head 9 for movement in a vertical plane containing the axis of the nail member 8.

A pair of legs 16 and 17 are respectively secured at ends 18 and 19 thereof to the clevis members 12 and 13 and normally extend downwardly and outwardly from the nail member 8, but are free to pivot with the ears 14 from a position wherein the legs are directed downwardly and substantially parallel to each other to a position where the legs are horizontally aligned on opposite sides of the head 9.

The legs 16 and 17 are constructed of rigid, electrically non-conductive material such as synthetic resin impregnated fiberboard of the type used for electrical components and each has an upper surface 20 and a lower surface 21. A plurality of upwardly open hooks 22 are secured to the respective legs 16 and 17, against the upper surfaces 20, in spaced apart relation longitudinally thereof. The hooks 22 may be fastened to the legs 16 and 17 by any suitable means, in the illustrated example, rivets 23 extending transversely through the legs.

A pull ring 24 is engaged with the cylindrical head 9 above the pin 15 and is free to pivot thereabout. The ring 24 provides a convenient member for grasping the transfer saddle to remove same from a pole after use as described below.

In use, the nail member 8 is driven by a hammer or the like into the tapered top 4 of the pole 3. The point 11 and shank 10 enter coaxially into the pole to the extent where the side portion of the tapered top support the legs 16 and 17 outwardly and downwardly as illustrated in FIG. 2. The lineman releases the transmission lines on the insulators 7 of the upper cross arm 2 and places them in the respective hooks 22 as illustrated. When all the lines normally supported by the upper cross arm are, instead, supported by the transfer saddle, the upper cross arm 2 may be removed or repaired without line interference. After repair or replacement, the upper wires are again secured to the upper cross arm insulators and the transfer saddle is removed by pulling upwardly, preferably through engagement with the pull ring 24 and/or the shoulder 25 formed between the shank 10 and the head 9.

By using the above described transfer saddle a single lineman may repair or replace the upper cross arm instead of the two linemen that were, heretofore, normally required.

Although one form of this invention has been illustrated and described it is not to be limited thereto except insofar as such limitations are included in the following claims.

What is claimed and desired to be secured by Letters Patent is:

1. A transfer saddle for use on line poles and the like having a tapered top, said saddle comprising:

(a) a nail member having a head and a downwardly directed shank terminating in a lower point, (b) a pair of legs respectively pivotally mounted at one end thereof to said nail member and on opposite sides thereof, and (c) a plurality of upwardly open hooks secured to said legs in spaced apart relation longitudinally thereof, (d) whereby driving said shank into said tapered top produces engagement between said pole and said legs thereby holding said legs in a downwardly and outwardly directed position for receiving lines in said hooks.

2. The structure as set forth in claim 1 wherein:
 (a) said nail member has an elongated head and said shank is of smaller diameter than said head.

3. The structure as set forth in claim 1 wherein said legs are mounted to said nail member by:
 (a) first and second clevis members each having a pair of spaced apart ears, and a pin extends through said pairs of ears and transversely through said head, said pin pivotally mounting said clevis members on said head for movement in a plane containing the axis of said nail member.

4. The structure as set forth in claim 1 wherein:
 (a) said legs are of rigid electrically non-conductive material and each has an upper surface, and
 (b) said hooks are secured to said upper surfaces by fasteners extending into said non-conductive material.

5. The structure as set forth in claim 1 including:
 (a) a pull ring engaged with said head above said legs.

6. The structure as set forth in claim 1 including:
 (a) a downwardly directed shoulder formed between said head and said shank.

References Cited
UNITED STATES PATENTS

| | | | |
|---|---|---|---|
| 787,839 | 4/1905 | Ernst | 174—45 X |
| 1,793,733 | 2/1931 | Bodendieck | 174—45 X |
| 2,285,632 | 6/1942 | Urbain | 248—68 X |
| 3,076,556 | 2/1963 | Husted | 211—178 |

CHANCELLOR E. HARRIS, *Primary Examiner.*